(12) United States Patent
Humphreys et al.

(10) Patent No.: US 10,176,519 B2
(45) Date of Patent: Jan. 8, 2019

(54) 3D VIRTUAL STORE

(71) Applicant: CVS Pharmacy, Inc., Woonsocket, RI (US)

(72) Inventors: Dustin Wayne Humphreys, East Greenwich, RI (US); Vijay I. Kukreja, Cumberland, RI (US)

(73) Assignee: CVS PHARMACY, INC., Woonsocket, RI (US)

( * ) Notice: Subject to any disclaimer, the term of this patent is extended or adjusted under 35 U.S.C. 154(b) by 126 days.

(21) Appl. No.: 14/169,762

(22) Filed: Jan. 31, 2014

(65) Prior Publication Data

US 2014/0222627 A1    Aug. 7, 2014

Related U.S. Application Data

(60) Provisional application No. 61/759,629, filed on Feb. 1, 2013.

(51) Int. Cl.
| | | |
|---|---|---|
| *G06Q 30/06* | (2012.01) | |
| *G06F 3/0481* | (2013.01) | |
| *G06Q 30/00* | (2012.01) | |

(52) U.S. Cl.
CPC ..... *G06Q 30/0643* (2013.01); *G06F 3/04815* (2013.01)

(58) Field of Classification Search
CPC .................. G06Q 30/0643; G06F 3/04815
USPC ............................................. 705/26.1–27.2
See application file for complete search history.

(56) References Cited

U.S. PATENT DOCUMENTS

| | | | |
|---|---|---|---|
| 7,966,575 B1* | 6/2011 | Jetha et al. | 715/817 |
| 8,090,629 B2* | 1/2012 | Storch et al. | 705/27.1 |
| 8,762,227 B1* | 6/2014 | Fox | G06Q 30/0631 705/14.51 |
| 2005/0177463 A1* | 8/2005 | Crutchfield, Jr. | G06Q 30/06 705/26.9 |
| 2009/0096796 A1* | 4/2009 | Brown | G06T 13/40 345/473 |
| 2011/0004481 A1* | 1/2011 | Jones | 705/1.1 |
| 2012/0253837 A1 | 10/2012 | Cashman et al. | |
| 2012/0323796 A1* | 12/2012 | Udani | 705/80 |

FOREIGN PATENT DOCUMENTS

| | | | |
|---|---|---|---|
| WO | 200122308 A2 | 3/2001 | |
| WO | WO 0122308 A2 * | 3/2001 | G06Q 30/00 |

OTHER PUBLICATIONS

International Search Report for PCT/US2014/014164 dated Nov. 19, 2014.

* cited by examiner

*Primary Examiner* — William J Allen
*Assistant Examiner* — Anand R Loharikar
(74) *Attorney, Agent, or Firm* — Patent Law Works LLP

(57) ABSTRACT

A system for navigating products and services presented via a computer interface. The system may include a three-dimensional isometric view of a virtual store that may be displayed on a computer touchscreen. The displayed virtual store may include at least one internal wall of the virtual store, a plurality of virtual rows of shelves, each shelf containing virtual products, and a plurality of icons that, when selected, allow entry into at least one sub-store.

15 Claims, 26 Drawing Sheets

3D VIRTUAL STORE

CROSS-REFERENCE TO RELATED APPLICATIONS

This application claims priority to and the benefit of, and incorporates herein by reference by reference in its entirety, U.S. Provisional Patent Application No. 61/759,629, filed on Feb. 1, 2013.

TECHNICAL FIELD

Embodiments of the present invention relate to user interfaces for computing systems and, more specifically, to user interfaces to information and retail systems.

BACKGROUND

Traditional computer interfaces for selling (or otherwise presenting information on) goods and services rely on a flat, two-dimensional "menu"-style interface, in which text or icons representing the goods or services are presented in a menu, list, grid, or other such arrangement. The text or icons are presented without context, usually using a white or plain-colored background. The interface may group the goods by category, and may even have sub-interfaces or sub-stores dedicated to these categories, but the categories are still limited to a two-dimensional, context-free interface. While users may be accustomed to interfaces of this type, they may still have difficultly in locating a desired item or service due to the lack of context and/or visual feedback. Often, a user may resort to typing in a keyword or product name into a search entry box.

This navigational difficulty may be exacerbated if the user is using a touchscreen-based device, such as a smartphone or tablet PC. The touchscreen may be smaller than that of a desktop or laptop monitor, and the user may not have access to a keyboard with which to type in search terms. The user, therefore, may have to resort to scanning or swiping through long lists or icons in order to locate a desired good or service. A need therefore exists for an improved interface for computer-based shopping for goods, services, and/or information.

SUMMARY

Embodiments of the current invention relate to an isometric three-dimensional representation of a store (such as a pharmacy). A user of a touchscreen-based device can navigate around the store and/or rotate a view of the store by swiping a finger (or by performing another similar action) on the touchscreen. The representation of the store may include sub-stores to which the user may navigate by selecting or touching an icon representing the sub-store. Each sub-store may have a different, contextual interface customized to that particular store. An avatar may be presented to the user to facilitate interaction therewith, and the avatar (or other aspects of the store) may include a voice-recognition interface.

Embodiments of the current invention may thus include a system for navigating products and services presented via a computer interface, the system comprising: a three-dimensional isometric view of a virtual store, displayed on a computer touchscreen, comprising:
 i. at least one internal wall of the virtual store;
 ii. a plurality of virtual rows of shelves, each shelf containing virtual products; and
 iii. a plurality of icons that, when selected, allow entry into at least one sub-store.

In some embodiments, the virtual store is a pharmacy. In some embodiments, the at least one sub-store comprises a pharmacy counter sub-store, an extra-care sub-store, a minute-clinic sub-store, a photo sub-store, a shopping sub-store, and a weekly-ad sub-store. In some embodiments, a view of the virtual store rotates in response to user input. In some embodiments, the user input comprises touching and swiping the touchscreen. In some embodiments, the at least one sub-store comprises displaying a sub-store interface. In some embodiments, the sub-store interface comprises a wheel selector for navigating to another sub-store. In some embodiments, the sub-store interface comprises a home or back button for navigating back to the virtual store. In some embodiments, the sub-store interface comprises an avatar for interacting with a user. In some embodiments, the avatar comprises a voice-recognition interface. In some embodiments, the avatar is customizable by a user.

Embodiments of the current invention may further include a system for navigating products and services presented via a computer interface, the system comprising:
 i. a sub-store interface comprising a virtual pharmacy counter;
 ii. an avatar comprising a virtual depiction of a human being; and
 iii. a voice-recognition system for recognizing vocal input of a user.

In some embodiments, the avatar is customizable by a user. In some embodiments, the avatar greets a user upon entry to the sub-store. In some embodiments, the voice-recognition system allows filling or refilling a prescription.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

A software application installable on a tablet, smartphone, or other device includes a 3D isometric representation of a real-world store (such as a pharmacy). A user of the application may navigate within the store by zooming in or out or rotating the view of the store. The view of the store may include specialized sub-stores, such as a pharmacy counter, photo booth, clinic, cosmetic counter, or any other similar sub-store. When a user selects a sub-store, a specialized interface may be presented to the user that is suited to the sub-store.

Figure 1:
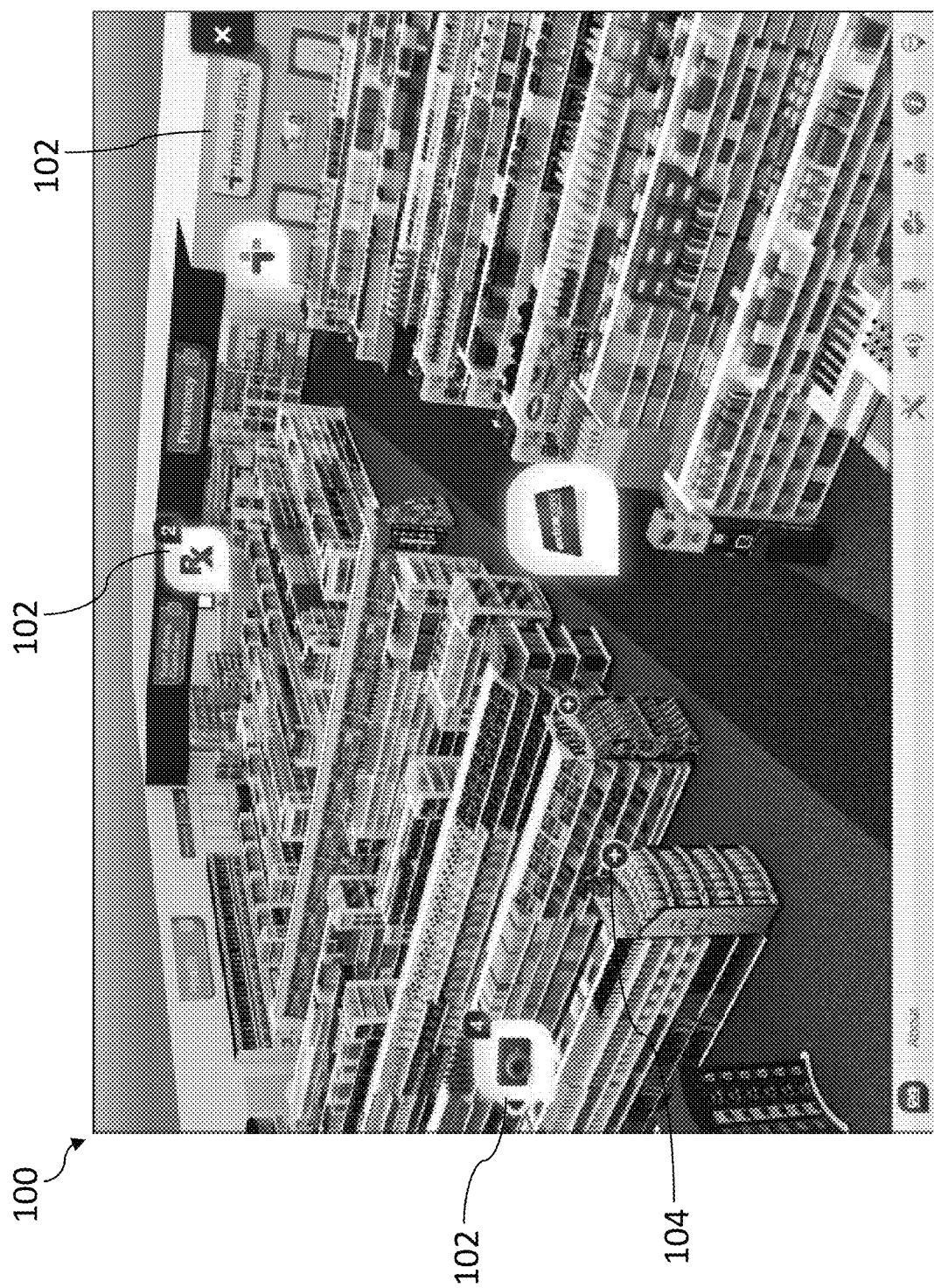
FIGS. 1-5 are representations of an interface depicting a 3D virtual store in accordance with embodiments of the invention.

FIG. 1 depicts a 3D virtual store interface 100. The virtual store 100 includes an isometric view of the store, wherein the point of view is a virtual "camera" at approximately ceiling height (e.g., ten to twelve feet above ground) looking down at the store. The virtual store 100 includes a representation of the inside of a real-world store, include depictions of aisles of goods, a floor of the store, and walls on the borders of the store. The layout of the virtual store 100 may correspond to a particular real-world store or to an idealized store. In one embodiment, a location of the user of the virtual store 100 is determined, and the layout of the virtual store 100 is configured to mimic a particular store near the user (or, alternatively, a store as specified by the user). Similarly, the goods on the shelves in the aisles of the virtual store 100 may correspond to goods on the shelves in a real-world store or to an idealized store.

Figure 2:
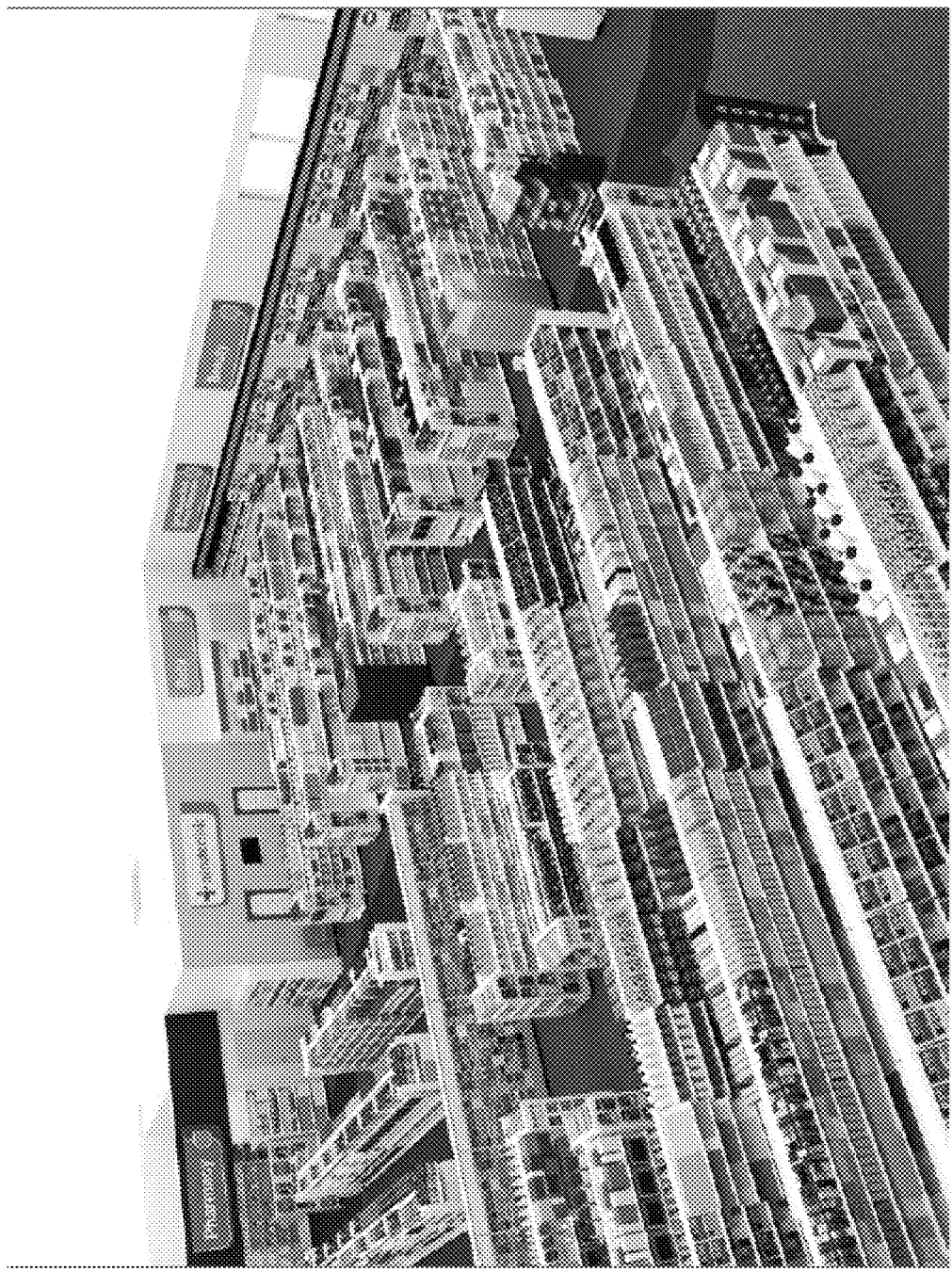
Figure 3:
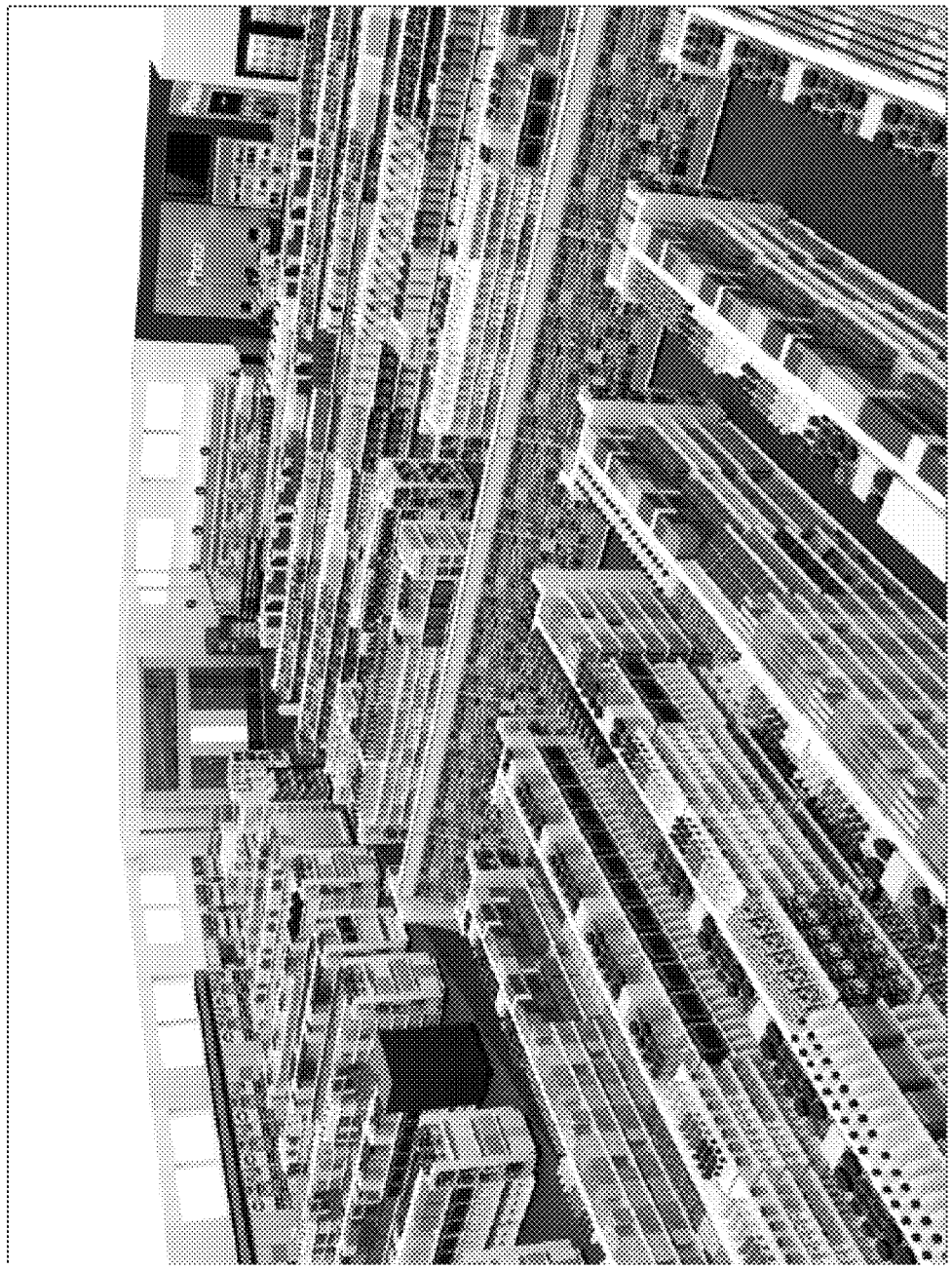
Figure 4:
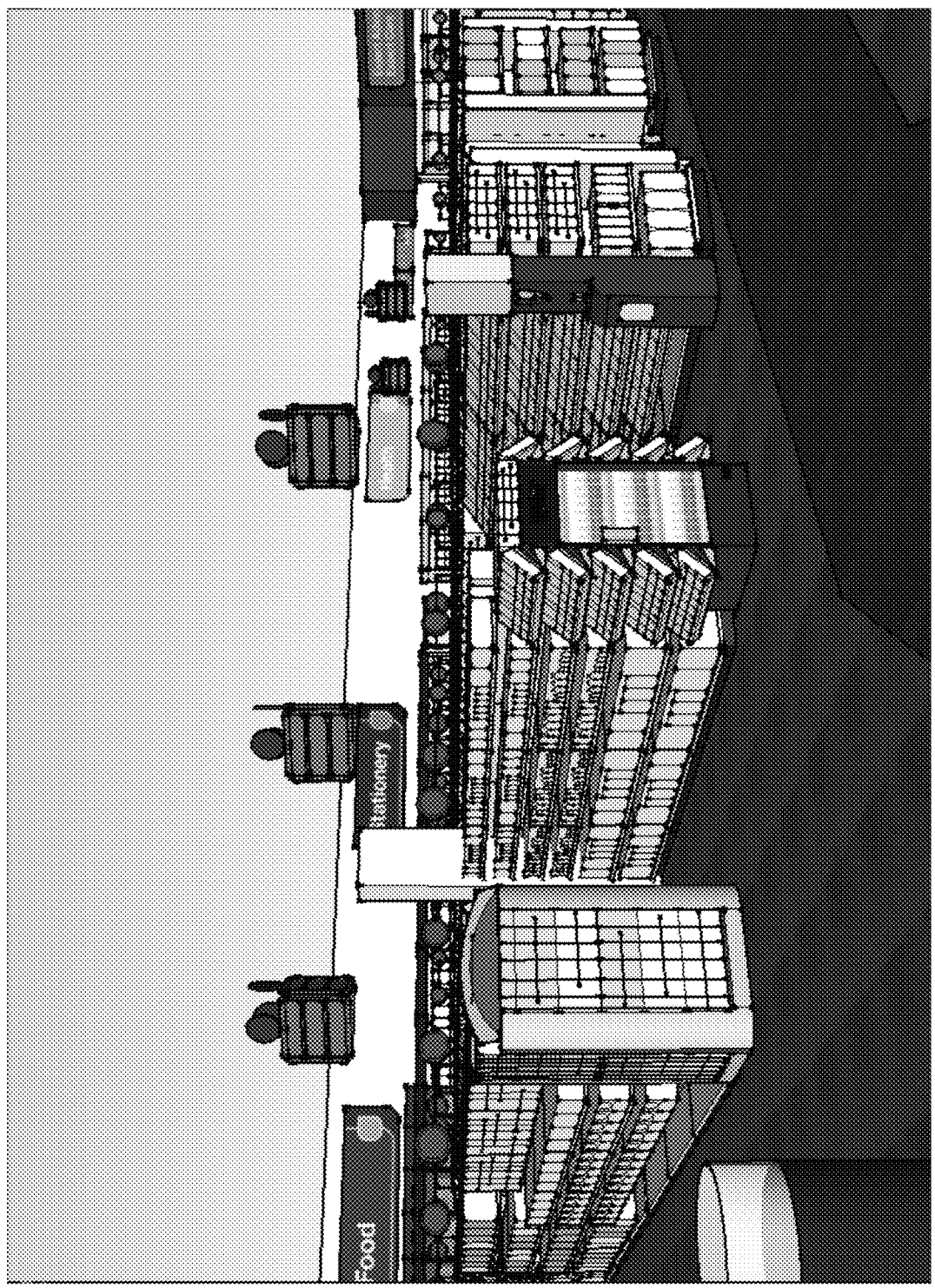
Figure 5:
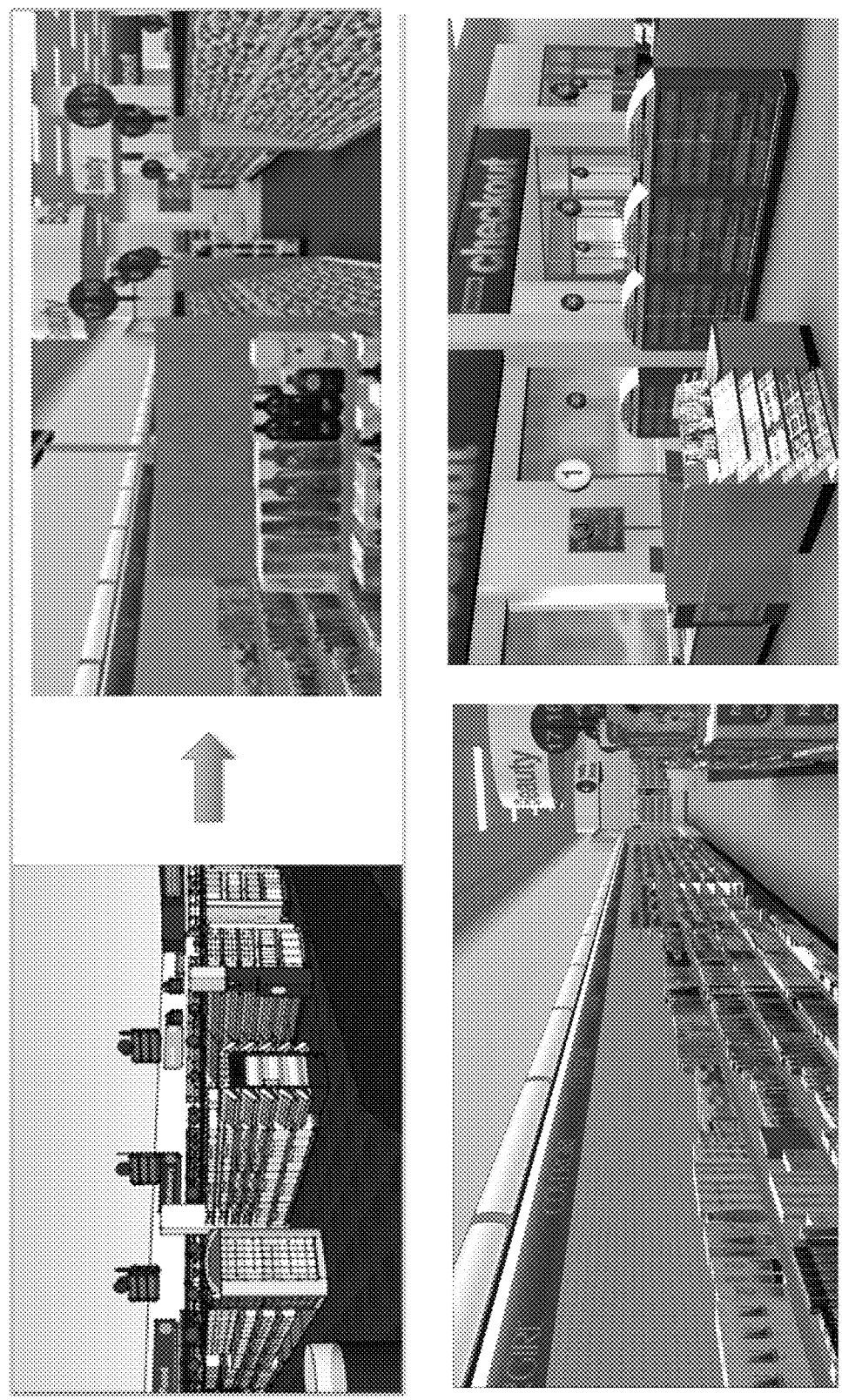
Figure 6:
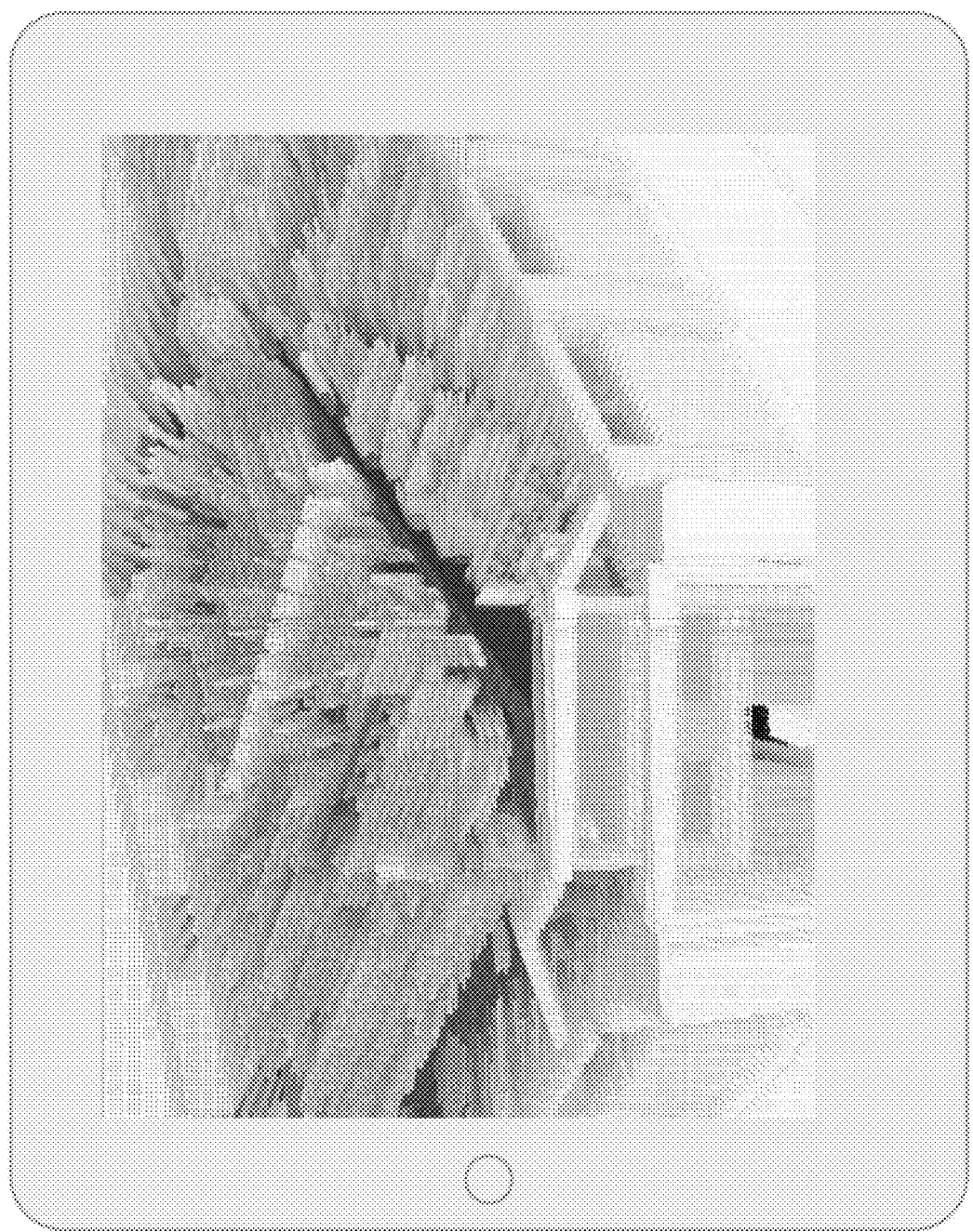
FIG. 6 is a representation of a transition effect for transitioning between the 3D virtual store and a sub-store in accordance with an embodiment of the invention.

FIGS. 2 and 3 depict different, rotated views of the virtual store 100. The user may rotate the view of the store by swiping a finger across a touchscreen, by selecting an appropriate navigational icon, or by any other means. Other navigational features (such as zoom in or zoom out) are also within the scope of the current invention. FIG. 4 depicts a "background" view of the virtual store at a lower camera angle. FIG. 5 depicts "ground-level" views of the virtual store that recreate an experience of a user walking down an aisle of a real store. The user may browse and select three-dimensional depictions of products and may purchase the products at a virtual terminal.

In one embodiment, the 3D view of the store 100 includes highlighted icons, dots, or other such markers 104 to call a user's attention to specific items in the store. In one embodiment, the highlighted items 104 are selected in accordance with a user preference or with a purchasing history of the user. In another embodiment, the highlighted items are selected in accordance with a third-party advertising campaign for the item(s). The highlighted items may include a display at the end of a row of goods (i.e., an "end cap") purchased by a third-party advertiser. In one embodiment, the logo of the advertiser is also displayed in the 3D view. In other embodiments, the rest of the items on the shelves are also selectable by the user for inspection or purchase.

The virtual store 100 may include one or more sub-stores. The user may click, touch, or select an icon 102 to enter a particular sub-store. Each icon 102 may be presented as a floating "bubble" or other such symbolic representation, as a "sign" on a wall of the virtual store 100, or by any other representation. When the user selects a sub-store, a transition effect (such as the one shown in FIG. 7) may be used to indicate to the user that a transition from the virtual store 100 to a sub-store is occurring.

Figure 7:
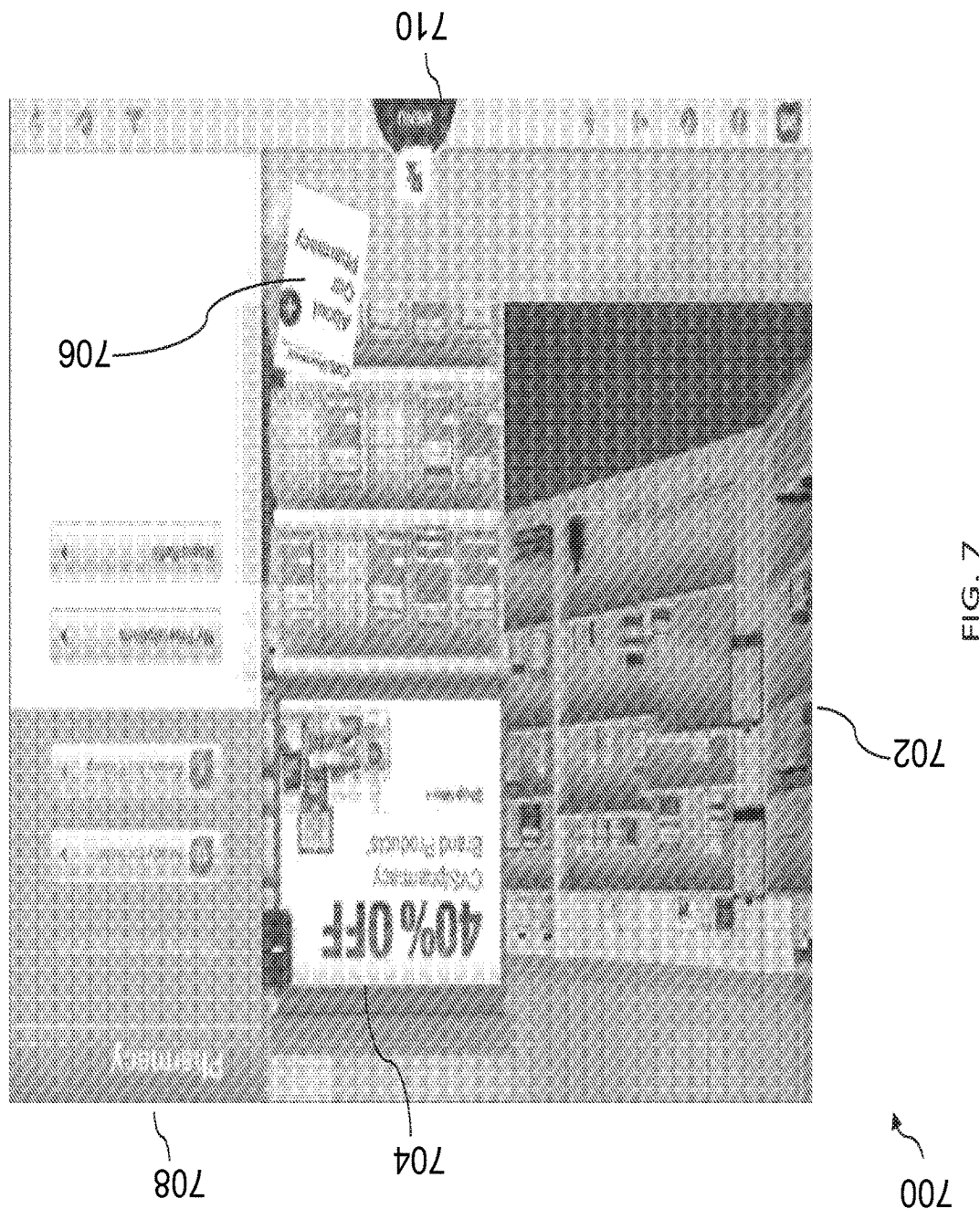
FIGS. 7-17 are representations of interfaces for sub-stores and mini-apps in accordance with embodiments of the invention.

FIG. 7 illustrates a view of a sub-store 700 (in this case, a pharmacy counter). A window 702 depicts a user view of the pharmacy counter 700 (i.e., a view as if the user were actually standing in front of a real-world pharmacy counter). The background of the window 702 may depict typical pharmacy equipment and products, such as shelves of bottles of medication, to enhance the illusion that the user is viewing a real-world pharmacy counter, as well as a desktop. A kiosk 704 may show an advertisement or other information, and an icon (e.g., a depiction of an information card 706 on the desktop) may invite the user to select it for more information (e.g., information about the pharmacy, or any other information). A side-window 708 may present a number of control buttons, functions, or interfaces and provide additional information to the user. For example, the side-window 708 may provide buttons that allow the user to order or refill a prescription. In other embodiments, the side-window 708 may allow the user to log into an existing user account or to create a new user account; the side-window 708 (and/or other components in the virtual store 100) may then use some or all of this information to personalize the interface (by, for example, adding the user's first name to the screen). In one embodiment, the user may be prompted to enter a photo to be associated with, and displayed with, their account.

In one embodiment, if the user selects a prescription refill option, the sub-store 700 may allow the user to identify an existing prescription (i.e., the one to be refilled) in a number of ways. For example, the user may enter an identification number printed on the prescription, scan a bar code or number printed on the prescription (with, for example, a camera attached to the device displaying the virtual store), and/or say the name or number of the prescription (via a voice-recognition interface). Once entered, the sub-store 700 may ask the user to confirm the prescription, specify or confirm a place for pick-up, and/or specify a time for pick-up. Selecting the place and time of pickup may involve the user selecting a place or time with a wheel or clock-like interface.

The side-window 708 may expand in size for certain functions, temporarily wholly or partially obscuring the window 702. For example, the side window 708 may expand to display a summary of a user's prescription information, including other prescriptions associated with the user's account. Any other information may be displayed in the expanded side-window 708, however.

Figure 8:
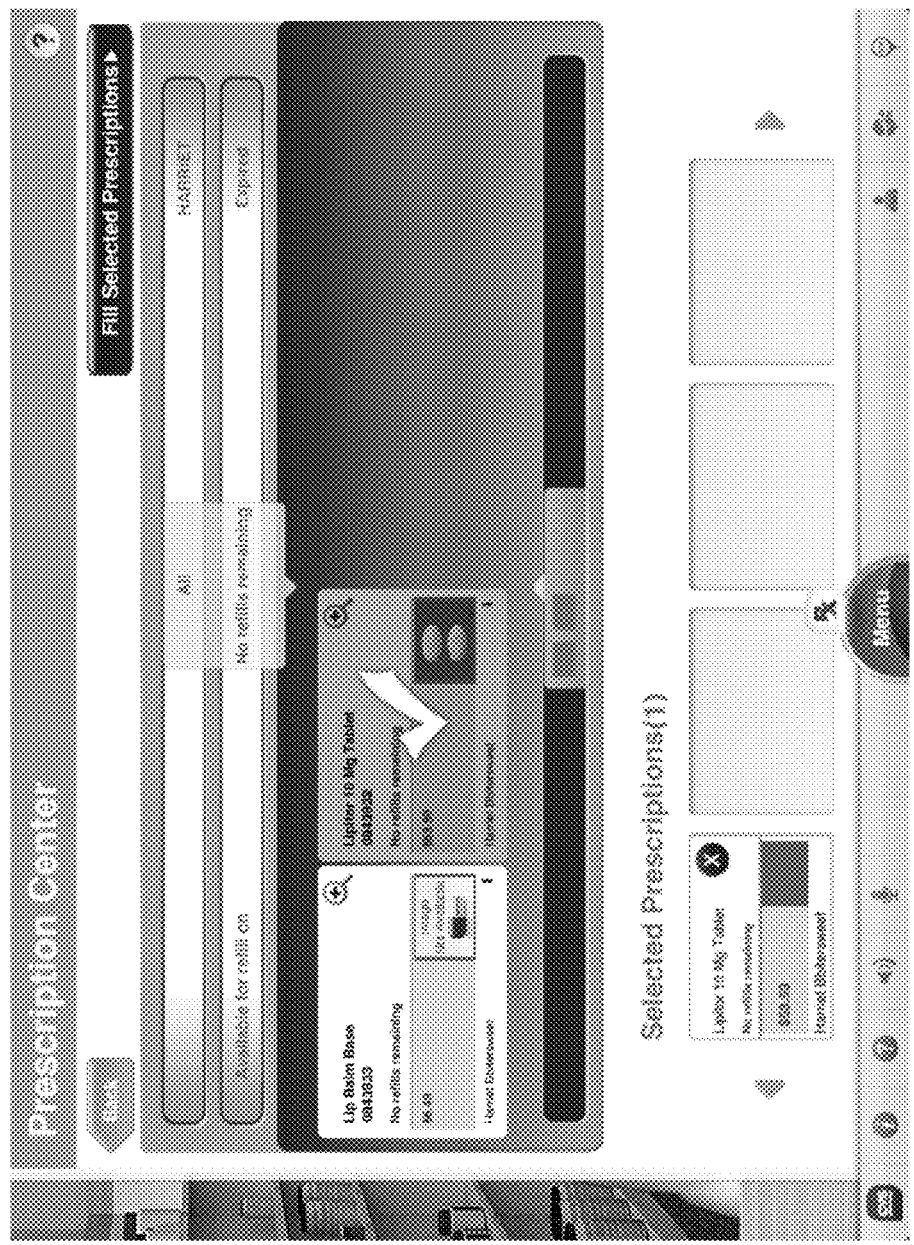
Figure 9:
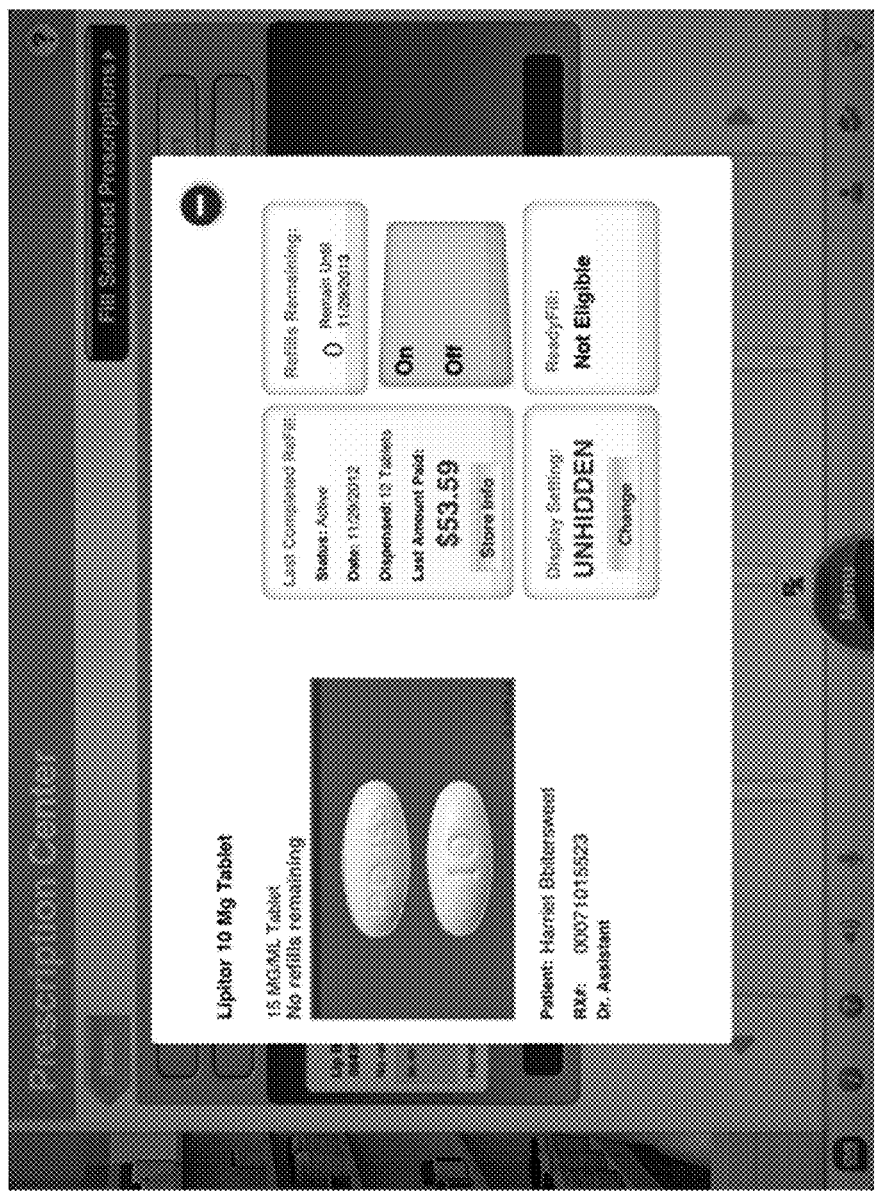
Figure 10:

In one embodiment, a user may leave the sub-store 700 by selecting a "home" or "back" function to return to the main virtual store 100. In another embodiment, a wheel-selector interface 710 permits the user to navigate to another sub-store without returning to the main virtual store 100. The wheel selector 710 may contain icons representing the current or other sub-stores. The user may enter one or more different sub-stores by manipulating the wheel selector 710 accordingly; the available sub-stores may wrap around in a circle if the user navigates to the last sub-store, allowing the user to return to the first sub-store. FIG. 8 illustrates an interface for the sub-store 700 designed to work with an avatar and/or voice commands, as described in greater detail below; FIG. 9 illustrates an interface for the sub-store 700 that includes selected drugs and status of prescription information.

FIGS. 10-17 include an exemplary selection of sub-stores, including a beauty sub-store 1000, a minute-clinic sub-store 1300, a photo sub-store 1500, a shopping sub-store 1600, and a weekly-ad sub-store 1700. The present invention is not limited to only these sub-stores, however. Each sub-store has a corresponding icon accessible from the main virtual store 100, and may also be visited by manipulation of the wheel selector 710. The beauty sub-store 1000 presents an interface that includes beauty and make-up products with which a user may interact. The beauty sub-store 1000, like any sub-store discussed herein, may include a sitting or standing avatar, as discussed further below.

Figure 11:
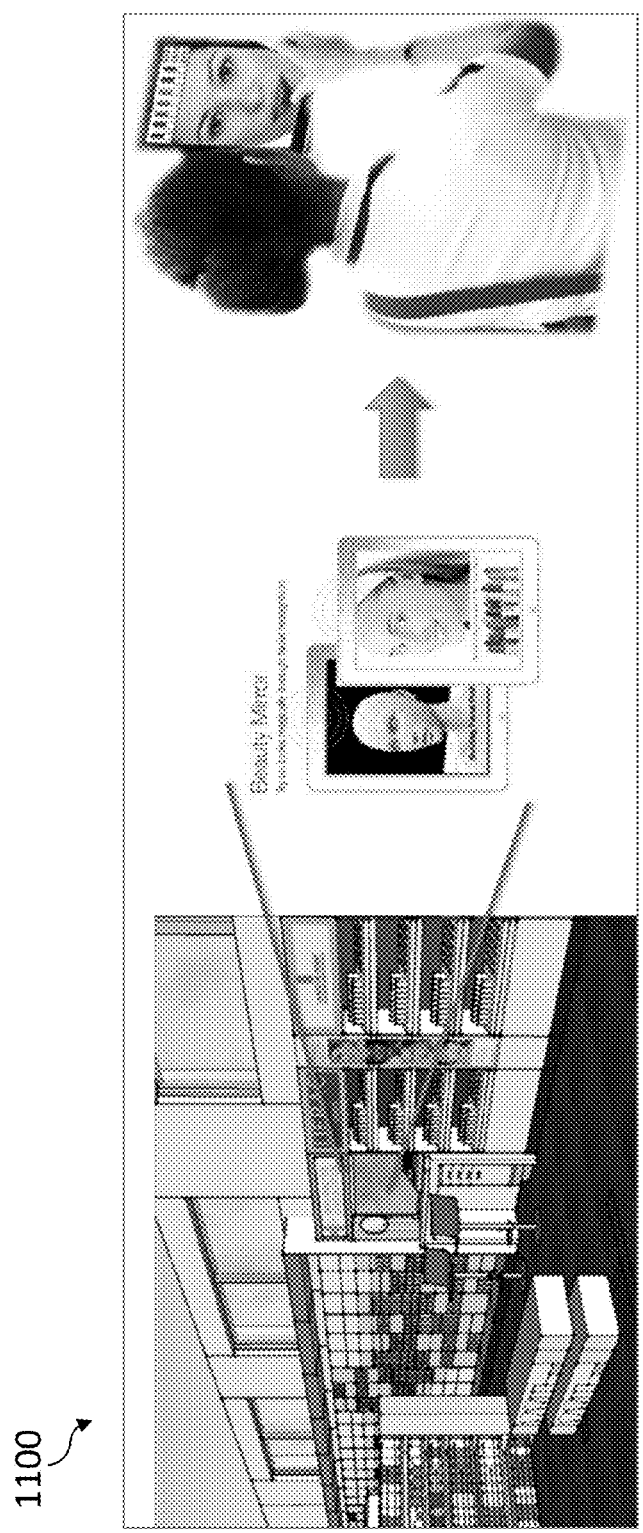

FIG. 11 illustrates one embodiment of a mini-app 1100 accessible within the beauty sub-store 1000. This particular mini-app 1100 is a beauty minor application, in which a user may adorn an image of a face (either the user's own face, uploaded from a photo taken with a camera on the device or other means, or a selected one of a library of faces) with different make-up, hairstyles, or other products or features. Alternatively or in addition, the mini-app 1100 may display side-by-side representations of the user's face as originally uploaded and as modified by the mini-app 1100. The mini-app 1100 may be launched by the user selecting an interactive element within the interface of the beauty sub-store, such as a mirror. In various embodiments, the beauty sub-store 1100 (or any other sub-store or main store) may similarly include interactive elements that launch other mini-apps. In these embodiments, any products that the user may interact with (e.g., the make-up selected in the mini-app 1100) may be selected for purchase (for shipment to the user's address or picked up at a local store).

Figure 12:
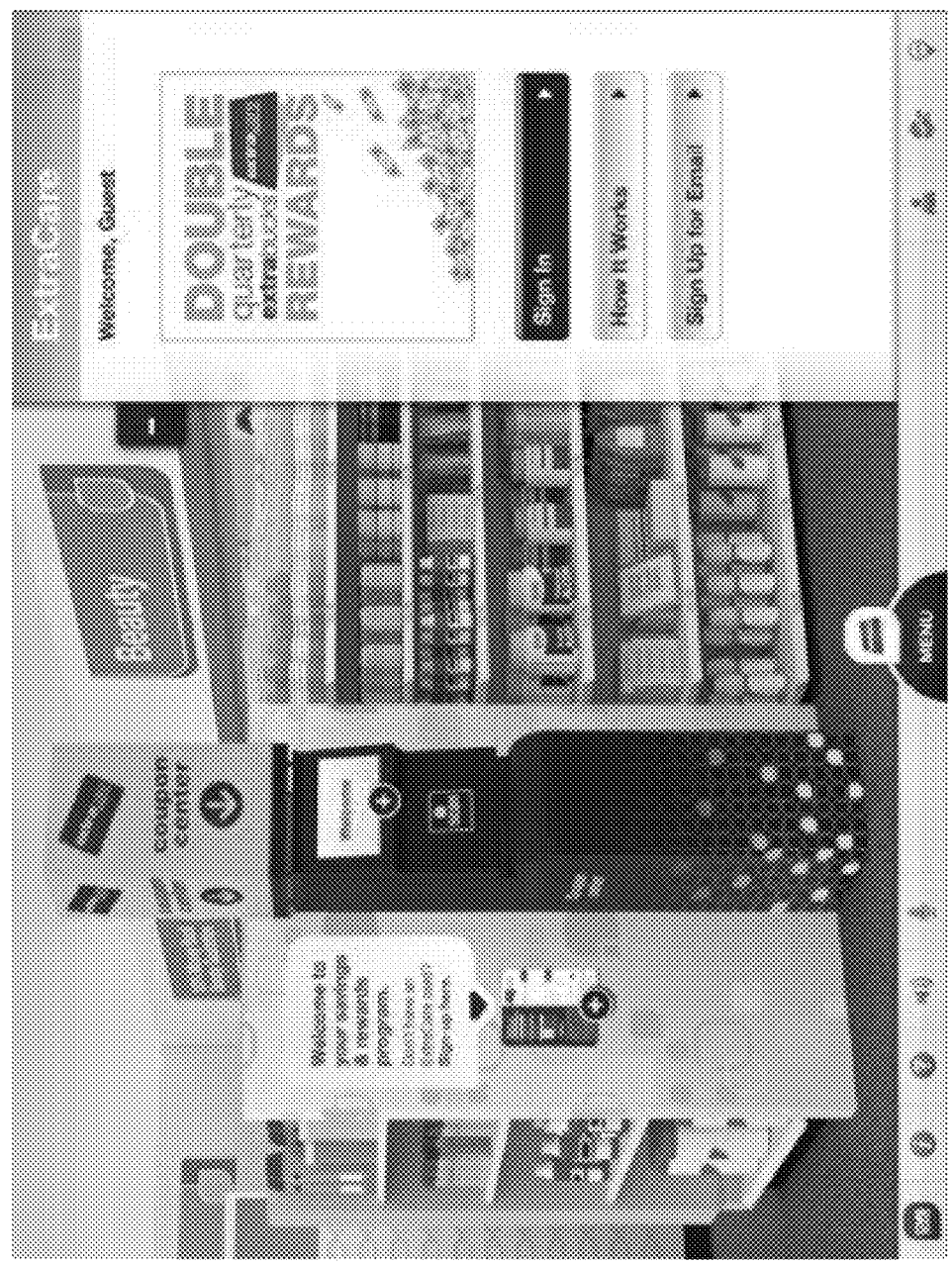
Figure 13:
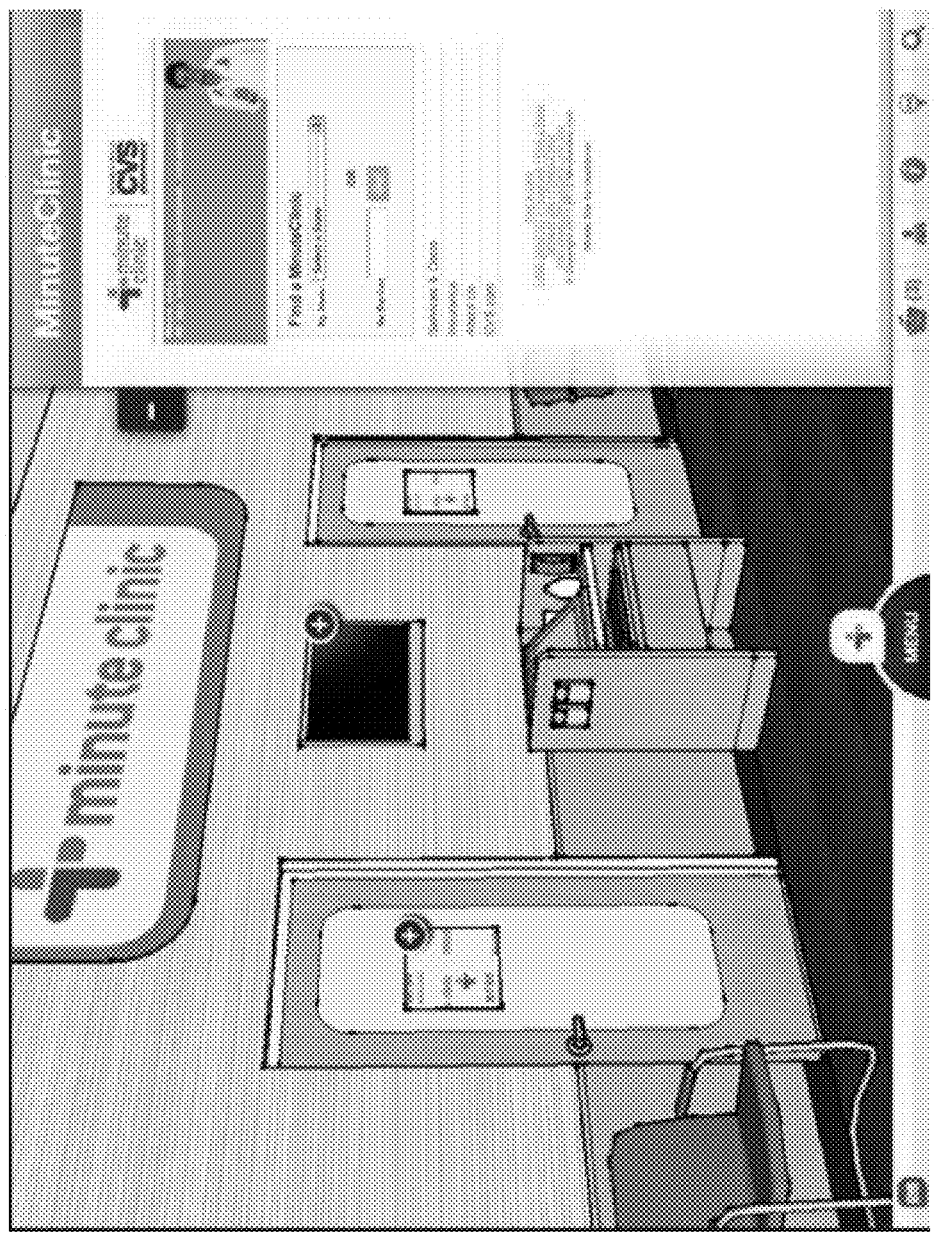
Figure 14:
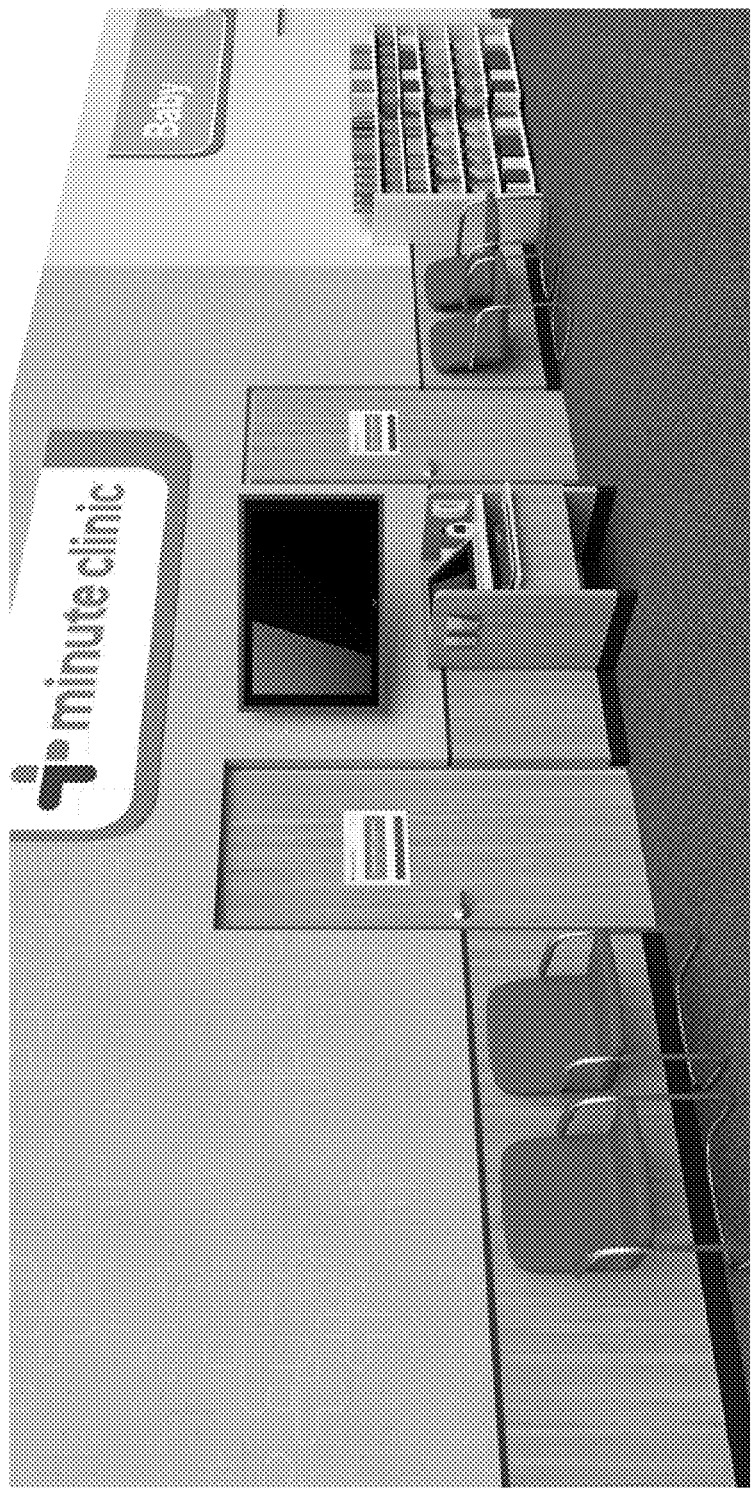
Figure 15:
Figure 16:
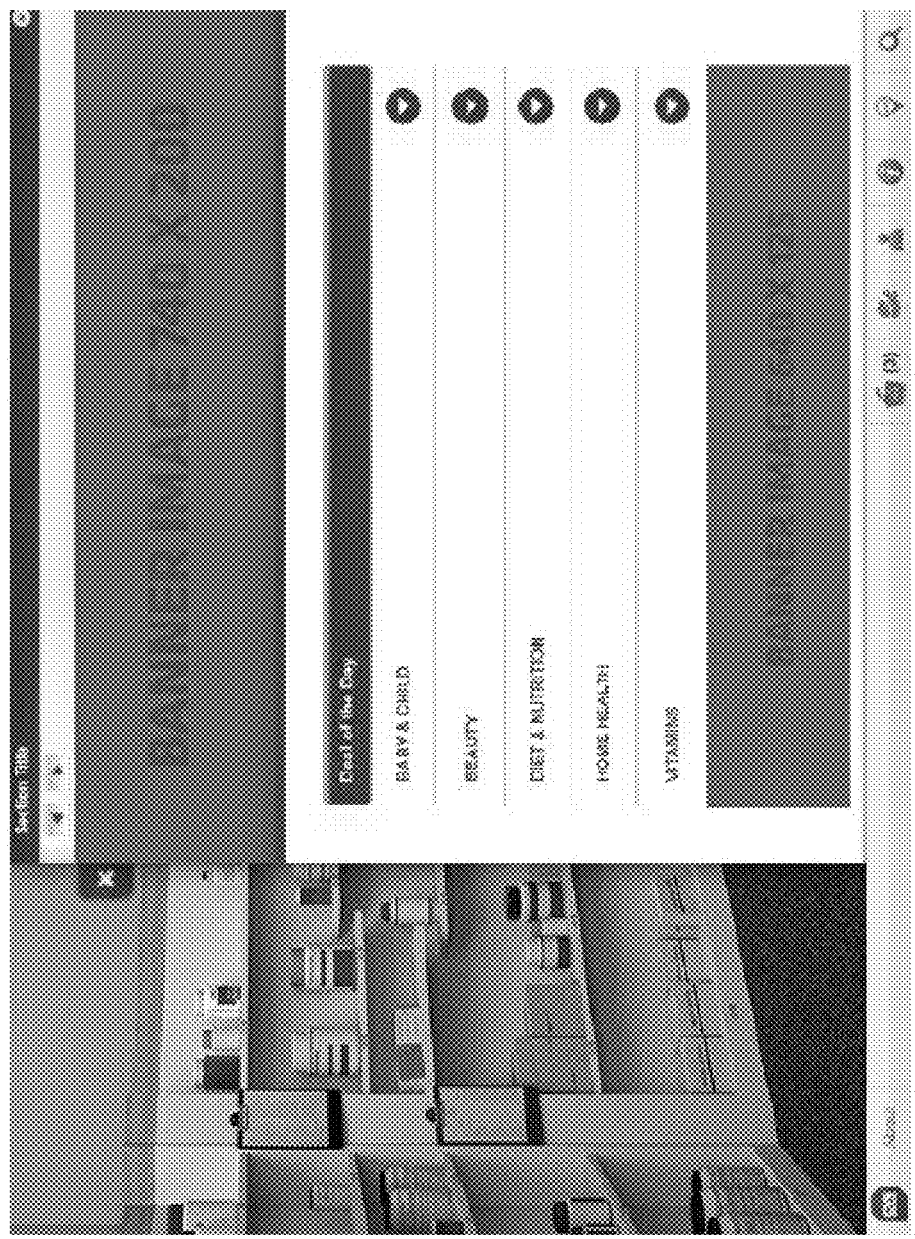
Figure 17:
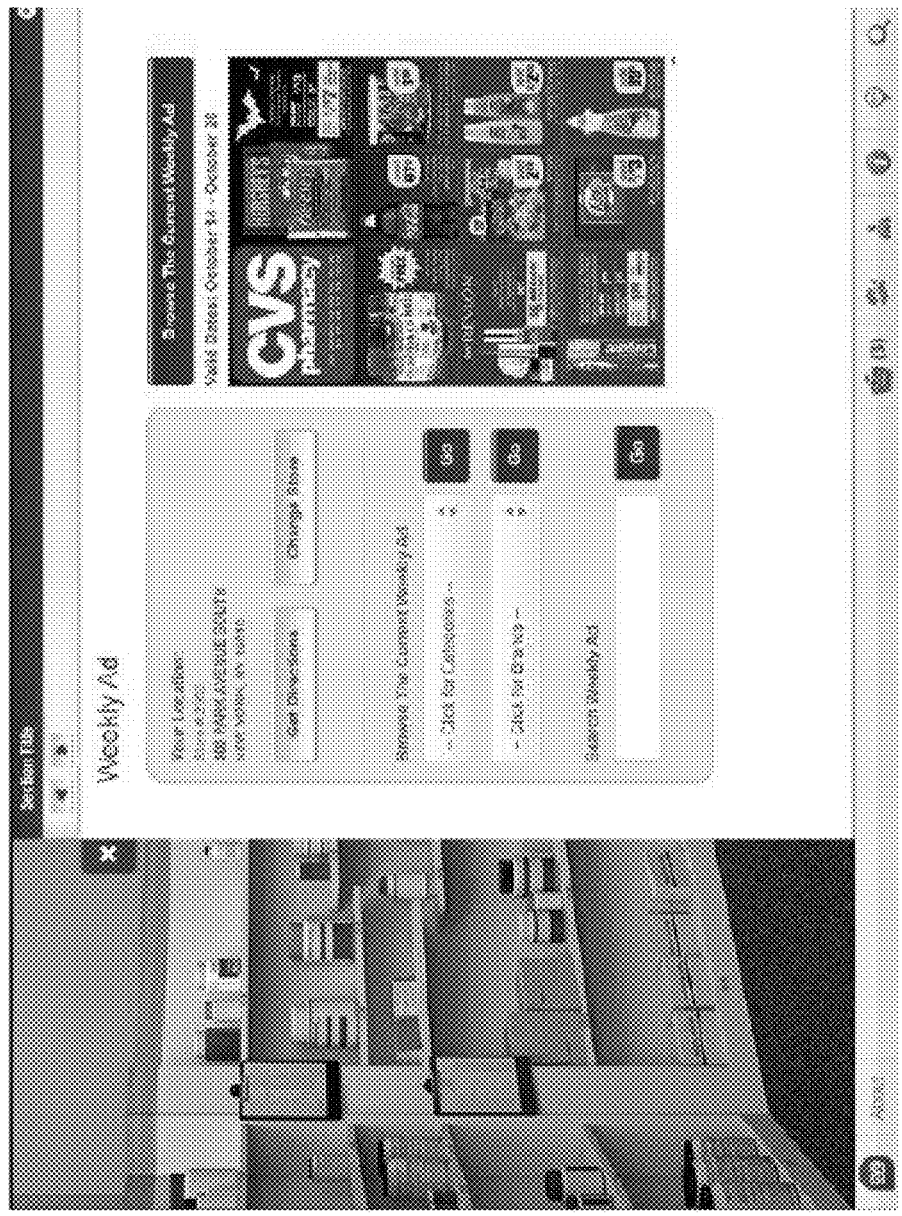
Figure 18:
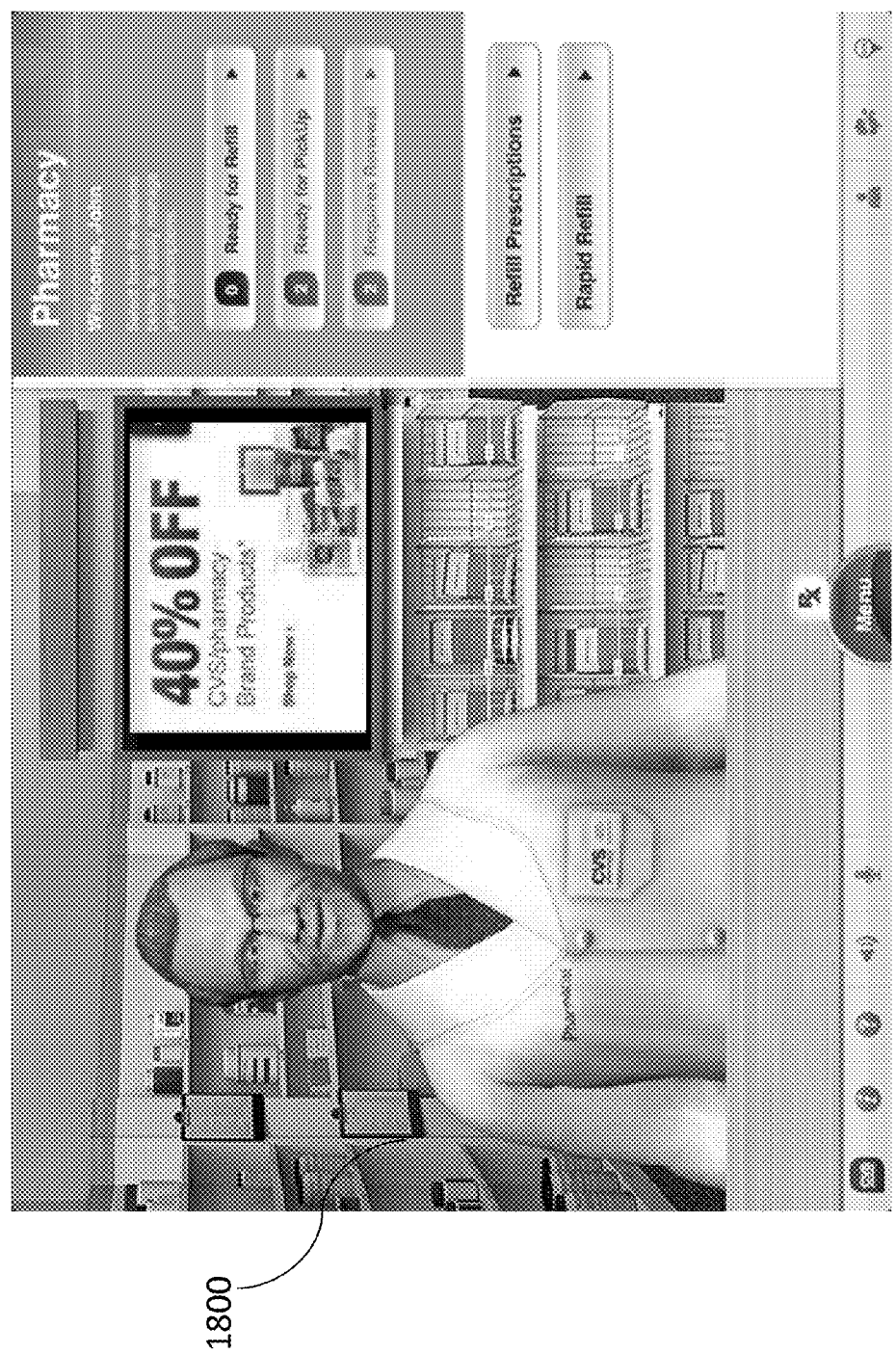
FIG. 18-22 are representations of a sub-store having an interactive avatar in accordance with embodiments of the invention.
Figure 19:
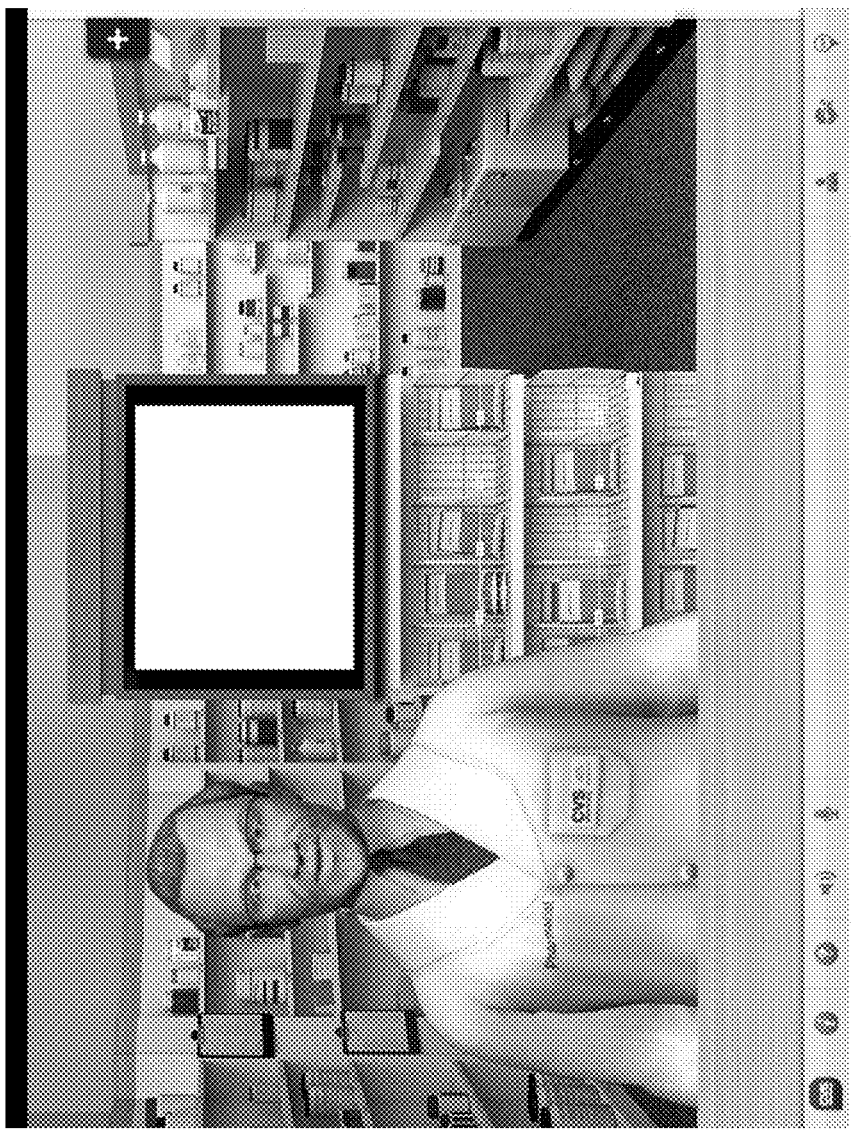
Figure 20:
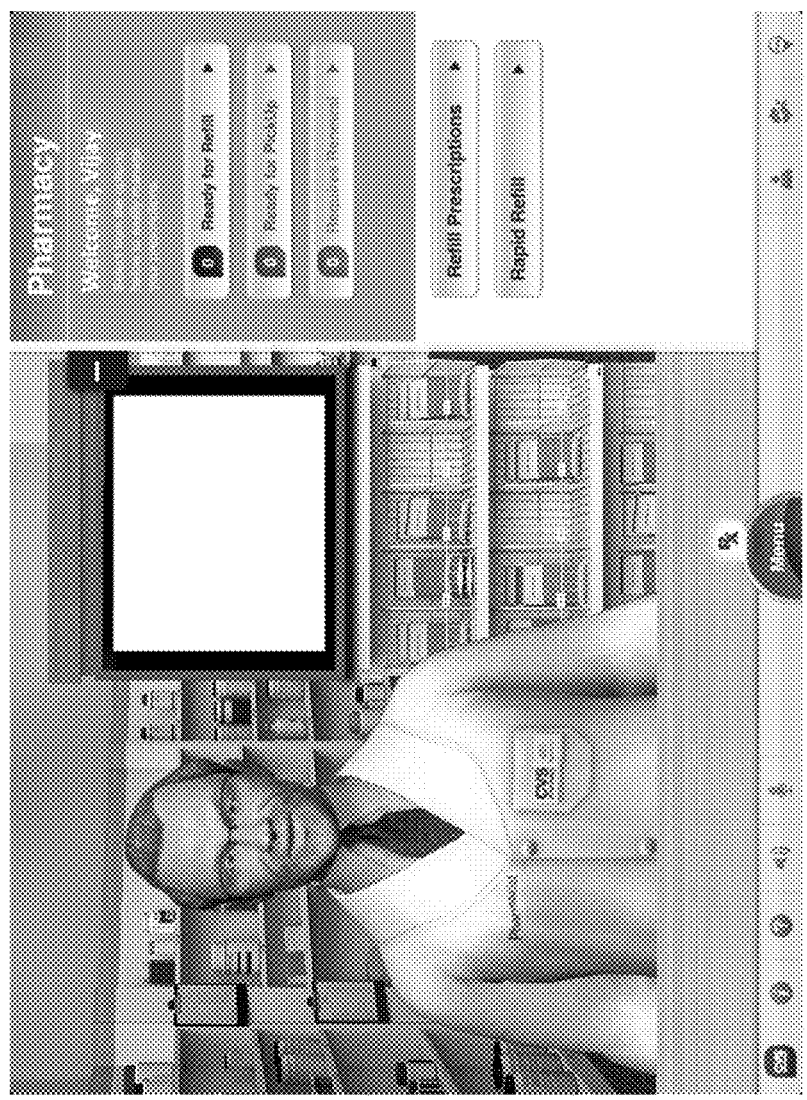
Figure 21:
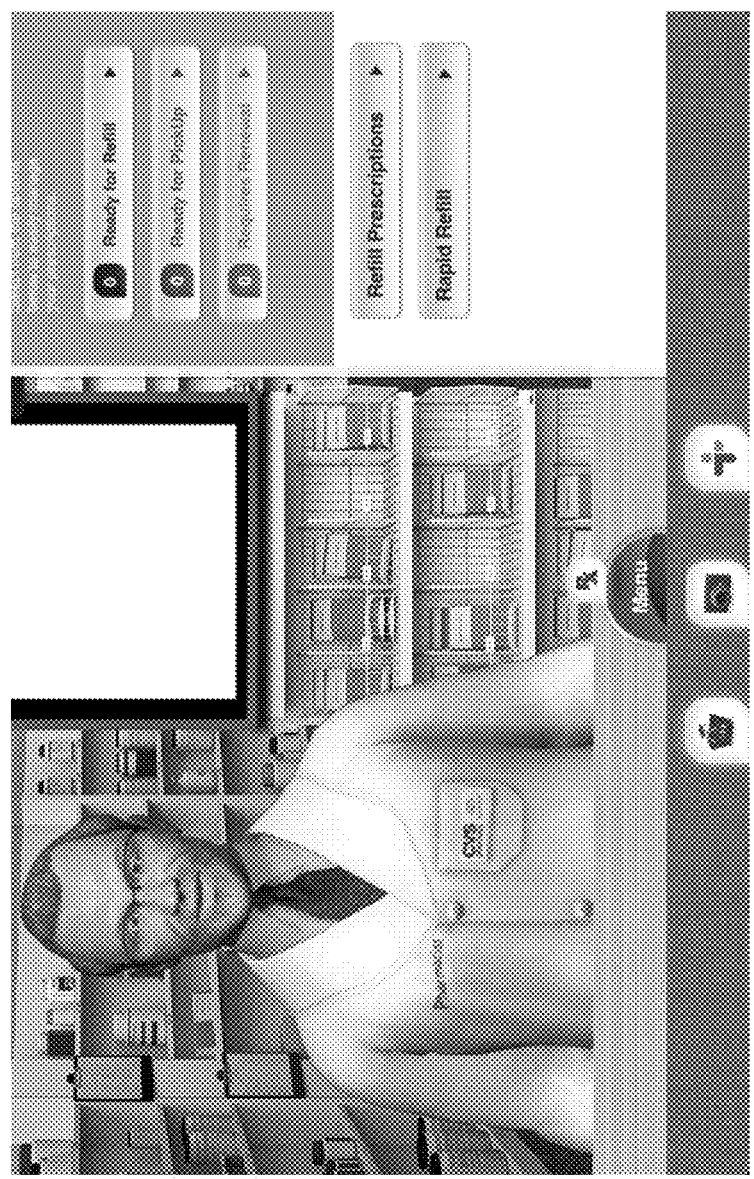
Figure 22:
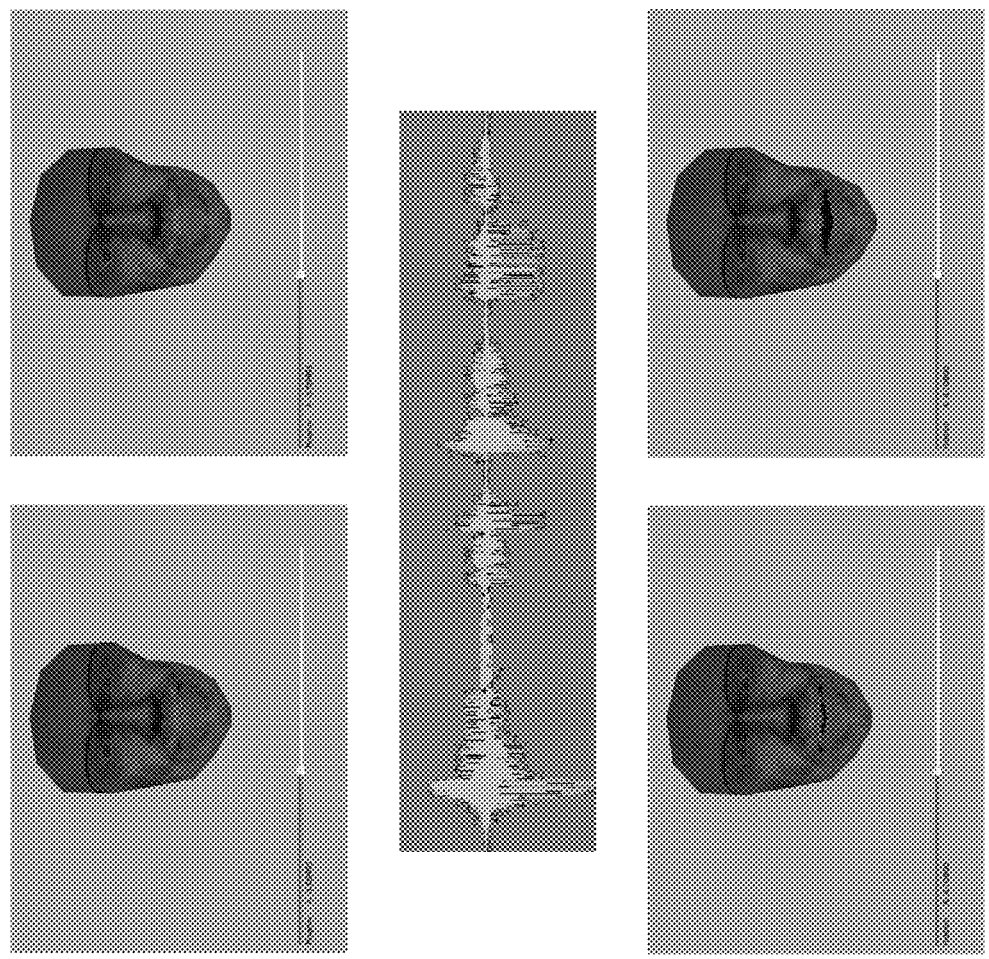
Figure 23:
FIGS. 23 and 24 are representations of alternative views of the virtual store in accordance with embodiments of the invention.
Figure 24:
Figure 25:
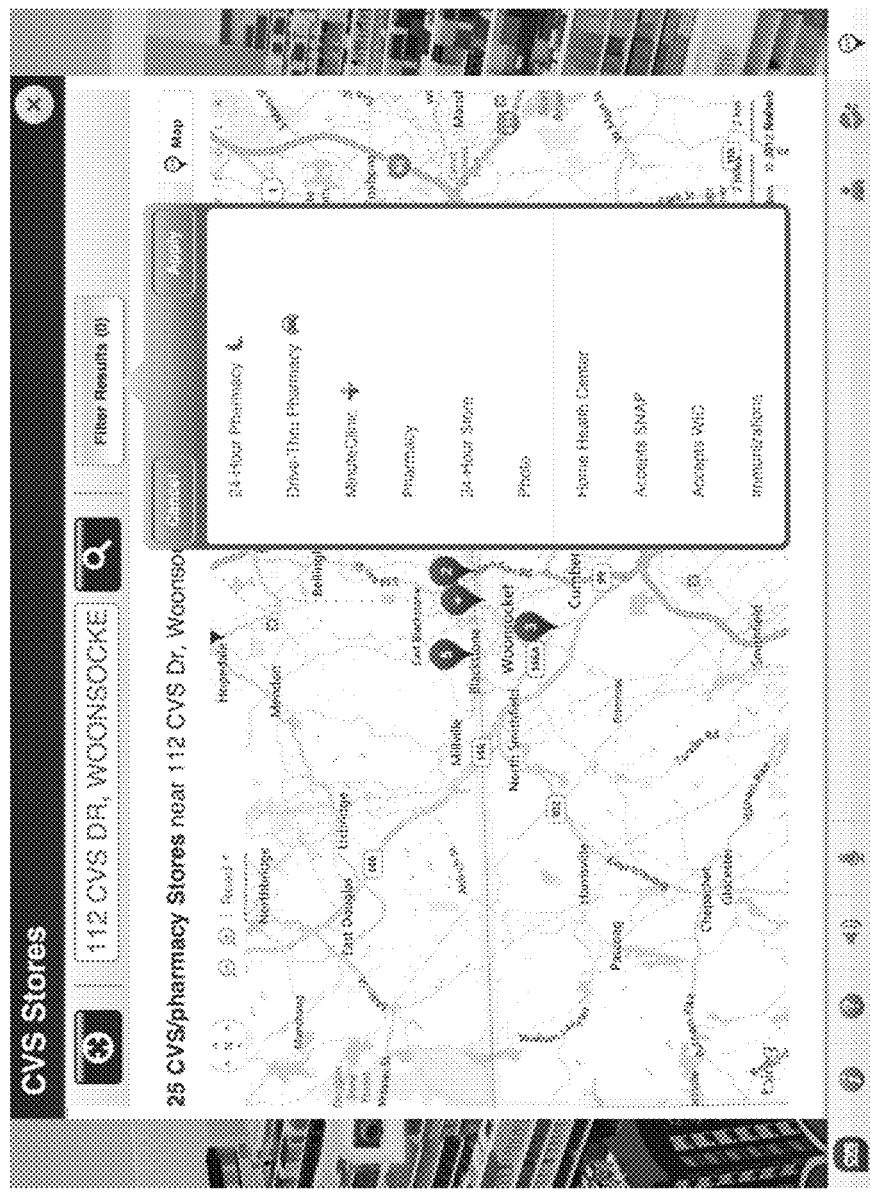
FIG. 25 is a representation of a store-locator function in accordance with an embodiment of the invention.

FIG. 12 illustrates an interface 1200 that may allow the user to access, change, or link a rewards program associated with the user's account or a rewards card. The minute-clinic sub-store 1300 may allow a user to locate a minute clinic and/or receive information about a minute clinic's services, costs, and/or insurance information, and may include a kiosk for scheduling an appointment at a real-world minute clinic. The photo sub-store 1500 may allow a user to view, manage, add, or delete photos for printing. The shopping sub-store 1600 may allow the user to browse products available for purchase in the virtual store 100, as well as see which products are on sale. The weekly-ad sub-store 1700 may allow a user to browse products being promoted.

FIGS. 18-21 illustrates an avatar 1800 added to the pharmacy counter sub-store 700 (the avatar 1800 may, however, be used with any sub-store and/or with the virtual store 100). The avatar 1800 is a full or partial representation of a human. The avatar may greet the user upon entry of the virtual store 100, upon entry of the pharmacy sub-store, upon entry of the minute clinic, and/or upon entry of other parts of the store. The avatar may be modeled after a real-world person, be computer-generated, or any combination of the two.

In various embodiments, the user may select from a library of possible avatars and/or customize the appearance, tone, voice, or other attributes of an avatar. The avatar may be placed to one side of the user's screen to allow the user to view a part of the store or sub-store. In one embodiment, the avatar is combined with a voice-recognition system for receiving voice commands or requests from the user, parsing the requests, and responding with voice-based information. The voice responses may be computer-generated or derived from recorded human voices. In one embodiment, the system manipulates the avatar's mouth and facial features to match the voice responses to thereby make it appear that the avatar is speaking to the user. The avatar's body language and stance may similarly be manipulated to convey further information to the user.

In one embodiment, the face of the avatar 1800 is dynamically altered in accordance with the audio voice track associated with the avatar to more completely create the illusion that the avatar is speaking the words contained in the audio voice track. The audio voice track may be analyzed, for example to determine the frequency, pitch, cadence, tone, and/or other parameters associated therewith. Based on this analysis, the mouth of the avatar may be opened more or less, take on a different shape, and/or closed entirely as the audio track is played. Different portions of the avatar's mouth may be moved for different levels of pitch; for example, a low pitch may cause the avatar's lips to take on an "O" shape, while a high pitch may cause the avatar's lips to be drawn in a tight line.

For example, a user may speak a sentence of the form, "Where can I find more information on a particular drug," in which the user speaks the name of the drug for which information is requested; the voice-recognition system may receive, analyze, and interpret the users request and respond, via the avatar 1800, with relevant information. The voice-recognition system may be also used without the avatar 1800 to, for example, navigate through the store 100, fulfill specific requests such as refilling a prescription, find a real-world store, for shopping, or for looking up drug information.

Figure 26:
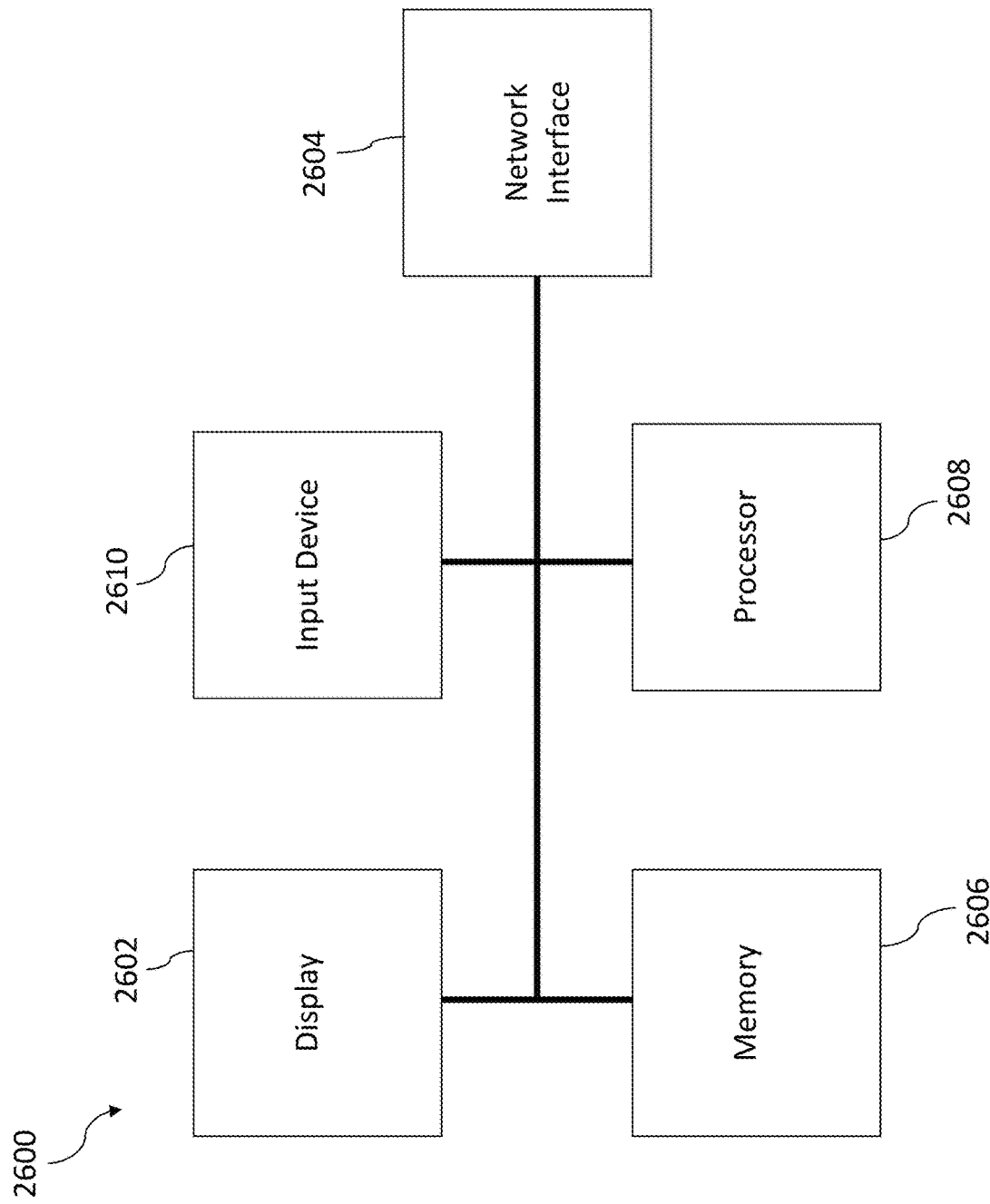
FIG. 26 is a block diagram of a client system for implementing the interface in accordance with embodiments of the present invention.

FIG. 26 illustrates a system 2600 for running embodiments of the current invention. For example, the interface 100 of FIG. 1 may be displayed on a display 2602. Computer instructions (e.g., an application) for creating the interface 100, receiving and interpreting user input, computing interaction results, and communicating with other computers and systems (via a network interface 2604) may be stored on a memory 2606 and executed on a processor 2608. A user input device 2610 accepts input from a user. The display 2602 may be a smartphone display, tablet display, computer display, or any other such display device. The network interface 2604 may be a Wi-Fi interface, ethernet interface, USB interface, cellular-phone data interface, or any other such network interface. The memory 2606 may be any type of volatile (e.g., RAM) or non-volatile (e.g., ROM, flash, SSD, or hard disk) storage device. The processor 2608 may be any general-purpose, digital-signal, ASIC, or other such processor. The input device 2610, as stated above, may be a voice input, a camera, and NFC interface, a (hard or soft) keyboard, a touchscreen, or any other such input device. The computer instructions may be loaded onto the system 2600 via a market interface associated with the device, via a web link, or by any other such means.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A system for navigating products and services presented via a computer interface, the system comprising:
    a computer memory for storing executable computer instructions;
    a user interface for receiving user input;
    a computer processor configured for executing the computer instructions to:
        display, on the user interface a three-dimensional isometric view of a virtual store comprising:
            at least one internal wall of the virtual store and a floor of the virtual store;
            a plurality of virtual rows of shelves, each shelf containing virtual products, at least a subset of the displayed virtual products being highlighted based upon a purchasing history associated with a user, wherein a first subset of the highlighted items is indicated by placement on a virtual shelf and a second subset of the highlighted items is indicated by placement on a virtual shelf end cap; and
            a plurality of icons that, when selected, allow entry into at least one sub-store, at least one of the plurality of icons being displayed as a symbol over a shelf, the symbol corresponding to the sub-store,
        the three-dimensional view of the virtual store including a positioning of the at least one internal wall, the floor, and the plurality of virtual rows of shelves corresponding to a layout of a real-world store,
        display a view of a first sub-store interface in response to a first user input, the view of the first sub-store interface comprising a first set of virtual products associated with the first sub-store, at least a subset of the first set of virtual products associated with the first sub-store being highlighted based upon the purchasing history associated with the user; and
        transition to a view of a second sub-store interface in response to a second user input, the view of the second sub-store interface comprising a second set of virtual products associated with the second sub-store, the second set of virtual products associated with the second sub-store distinct from the first set of virtual products associated with the first sub-store, at least a subset of the second set of virtual products associated with the second sub-store being highlighted based upon the purchasing history associated with the user, the first set of virtual products associated with the first sub-store and the second set of virtual products associated with the second sub-store displayed in the three-dimensional isometric view of the virtual store,
    wherein the first sub-store interface comprises an avatar for interacting with the user, wherein a face of the avatar is dynamically altered based on an audio voice track associated with the avatar, wherein lips on the face of the avatar form a first shape for a first pitch level of the audio voice track and form a second shape for a second pitch level of the audio voice track.

2. The system of claim 1, wherein the virtual store is a pharmacy.

3. The system of claim 1, wherein the at least one sub-store comprises a pharmacy counter sub-store, an extra-care sub-store, a minute-clinic sub-store, a photo sub-store, a shopping sub-store, and a weekly-ad sub-store.

4. The system of claim 1, wherein a view of the virtual store rotates in response to user input.

5. The system of claim 4, wherein the user interface comprises a touchscreen and the user input comprises touching and swiping the touchscreen.

6. The system of claim 1, wherein the first sub-store interface comprises a wheel selector for navigating to another sub-store.

7. The system of claim 1, wherein the first sub-store interface comprises a home or back button for navigating back to the virtual store.

8. The system of claim 1, wherein the avatar comprises a voice-recognition interface.

9. The system of claim 1, wherein the avatar is customizable by a user.

10. The system of claim 5, the computer processor executing the computer instructions to display a different set of virtual products in the rotated view in response to the user input.

11. The system of claim 1, wherein the user selects the real-world store.

12. The system of claim 1, the computer processor executing the computer instructions to determine a location of the user and to select the real-world store based on the determined location of the user.

13. The system of claim 1, wherein the symbol is a camera.

14. The system of claim 1, wherein the symbol is a prescription symbol.

15. The system of claim 1, wherein an arrangement of the virtual products on each shelf corresponds to an arrangement of corresponding products on shelves in the real-world store.

* * * * *